United States Patent [19]

Lebby et al.

[11] Patent Number: 5,345,530

[45] Date of Patent: Sep. 6, 1994

[54] MOLDED WAVEGUIDE AND METHOD FOR MAKING SAME

[75] Inventors: Michael S. Lebby; Shun-Meen Kuo, both of Chandler; Davis H. Hartman, Phoenix; Christopher K. Y. Chun, Mesa, all of Ariz.

[73] Assignee: Motorola, Inc., Schaumburg, Ill.

[21] Appl. No.: 103,497

[22] Filed: Aug. 6, 1993

Related U.S. Application Data

[62] Division of Ser. No. 889,335, May 28, 1992, Pat. No. 5,265,184.

[51] Int. Cl.$^5$ ............................................. G02B 6/42
[52] U.S. Cl. ..................................... 385/88; 385/89; 385/92
[58] Field of Search ................................. 385/88–94; 257/432, 433

[56] References Cited

U.S. PATENT DOCUMENTS

| | | | |
|---|---|---|---|
| 3,719,462 | 12/1970 | Andreatch, Jr. et al. | 385/129 |
| 4,225,213 | 9/1980 | McBride, Jr. et al. | 385/92 |
| 4,480,184 | 10/1984 | Ely | 250/227.22 |
| 4,609,252 | 9/1986 | Wong et al. | 385/130 |
| 4,647,148 | 3/1987 | Katagiri | 385/92 |
| 5,061,029 | 10/1991 | Ishikawa | 385/132 |
| 5,136,678 | 2/1991 | Yoshimura | 385/132 |
| 5,175,790 | 12/1992 | Groh et al. | 385/143 |
| 5,249,245 | 9/1993 | Lebby et al. | 385/89 |
| 5,276,754 | 1/1994 | Blair et al. | 385/88 |

OTHER PUBLICATIONS

L. L. Blyler, Jr. et al., "A Molded Polymeric Resin--Filled Coupler", Publication Proceedings of the 41st Electronics Components, and Technology Conference, May 3, 1991, Atlanta, Georgia, pp. 38–43.

*Primary Examiner*—Frank Gonzalez
*Attorney, Agent, or Firm*—Gary F. Witting; Eugene A. Parsons

[57] ABSTRACT

A method for manufacturing a molded waveguide (50) is provided. A first cladding layer (20) is provided. Channels (21) are formed in the first cladding layer (20). A second cladding layer (40) is subsequently provided. The channels (21) in the first cladding layer (20) are then filled with an optically transparent polymer. The second cladding layer (40) is subsequently affixed over the channels (21) of the first cladding layer (20), thereby enclosing the channels (21).

14 Claims, 3 Drawing Sheets

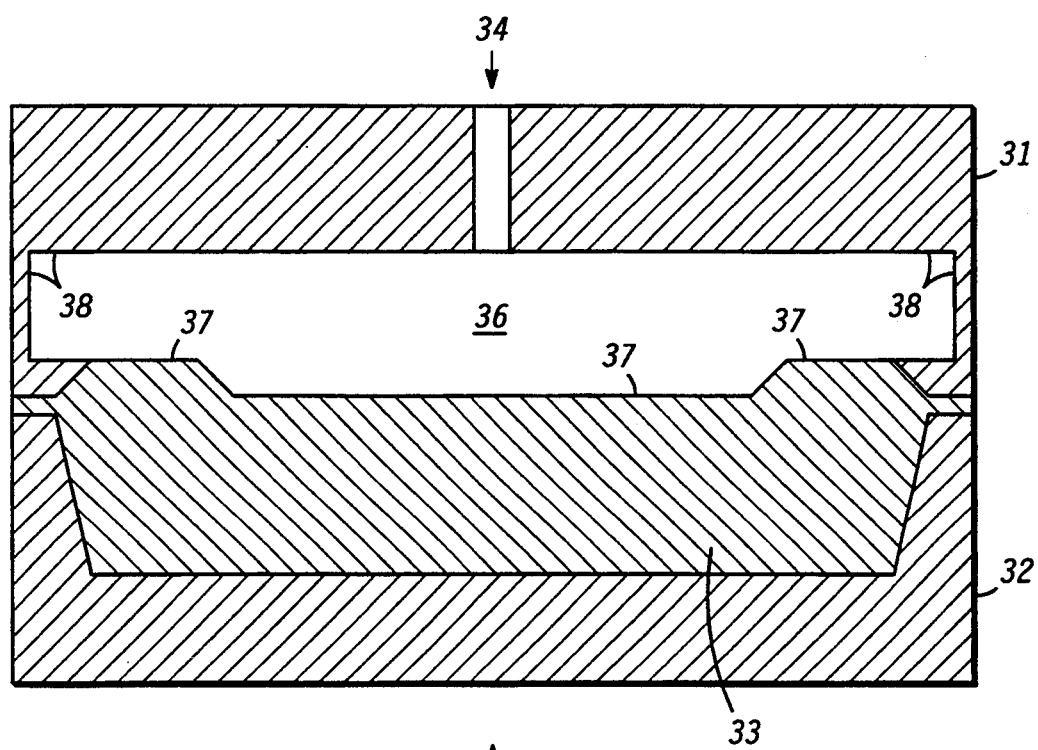
FIG. 3
FIG. 4
FIG. 5

MOLDED WAVEGUIDE AND METHOD FOR MAKING SAME

This is a division of application Ser. No. 07/889,335, filed May 28, 1992, now U.S. Pat. No. 5,265,184 issued on Nov. 23, 1993.

BACKGROUND OF THE INVENTION

This invention relates, in general, to waveguides and, more particularly, to fabrication of molded waveguides.

At the present time, fabrication of optical waveguides is achieved by either a polymer spin-on technique or a diffusion technique, both of which require expensive photolithography steps. Additionally, both fabrication techniques are ineffective and inefficient for fabricating optical waveguides in high volumes for several reasons, such as complex processing steps, difficulties in controlling the processing steps, and high cost.

Briefly, as practiced by one method in the prior art, a polymeric film is spun onto a substrate. Portions of the polymeric film are subsequently exposed to light by a photolithographic process, thereby changing the refractive index of the polymeric film and creating a waveguide in the polymeric film. However, subsequent multi-step processing, such as removal of the polymeric film from the substrate, lamination processing, curing, and other processes typically are required for the waveguide to be useful. Further, it should be noted that each additional processing step incurs an additional cost, as well as presenting an opportunity to induce defects into the waveguide.

Alternatively, in another method practiced in the prior art, a layer such as a glass is applied to a substrate. The layer is patterned by a complicated photolithography process, thereby producing portions that are masked and portions that are open or clear. Typically, ions are subsequently diffused into the open portions of the layer, thus changing the refractive index of the layer and making a waveguide. However, by using a photolithography process, a high cost is incurred into manufacturing of the waveguide. Also, by using diffusion processes to change the refractive index of the layer, control of dimensionality of the waveguide is severely limited.

Additionally, while making grooves in a plastic material and subsequently filling of these grooves with material for conducting light has been done in the past, these methods are only adequate for large mechanical orientated optical systems. Further, these methods characteristically are inefficient at conducting light, thus making them unsuitable for use in high speed communications.

It can be readily seen that conventional methods for making waveguides have severe limitations. Also, it is evident that the conventional processing uses a multitude of steps which are not only complex and expensive, but also not effective processing. Therefore, a method for making a waveguide that provides a reduction in the number of steps required, reduces cost, and simplifies the processes necessary for making a waveguide would be highly desirable.

SUMMARY OF THE INVENTION

Briefly stated, a method for manufacturing a molded waveguide is provided. A first cladding layer is provided. Channels are formed in the first cladding layer. A second cladding layer is subsequently provided. The channels in the first cladding layer are then filled with an optically transparent polymer. The second cladding layer is subsequently affixed over the channels of the first cladding layer, thereby enclosing the channels.

BRIEF DESCRIPTION OF THE DRAWINGS

FIG. 3 is a simplified cross-sectional view of another mold;

FIG. 4 is a simplified cross-sectional view of a molded second cladding layer;

FIG. 5 is a simplified cross-sectional view of the molded first cladding layer and the molded second cladding layer affixed together.

DETAILED DESCRIPTION OF THE DRAWINGS

Figure 1:
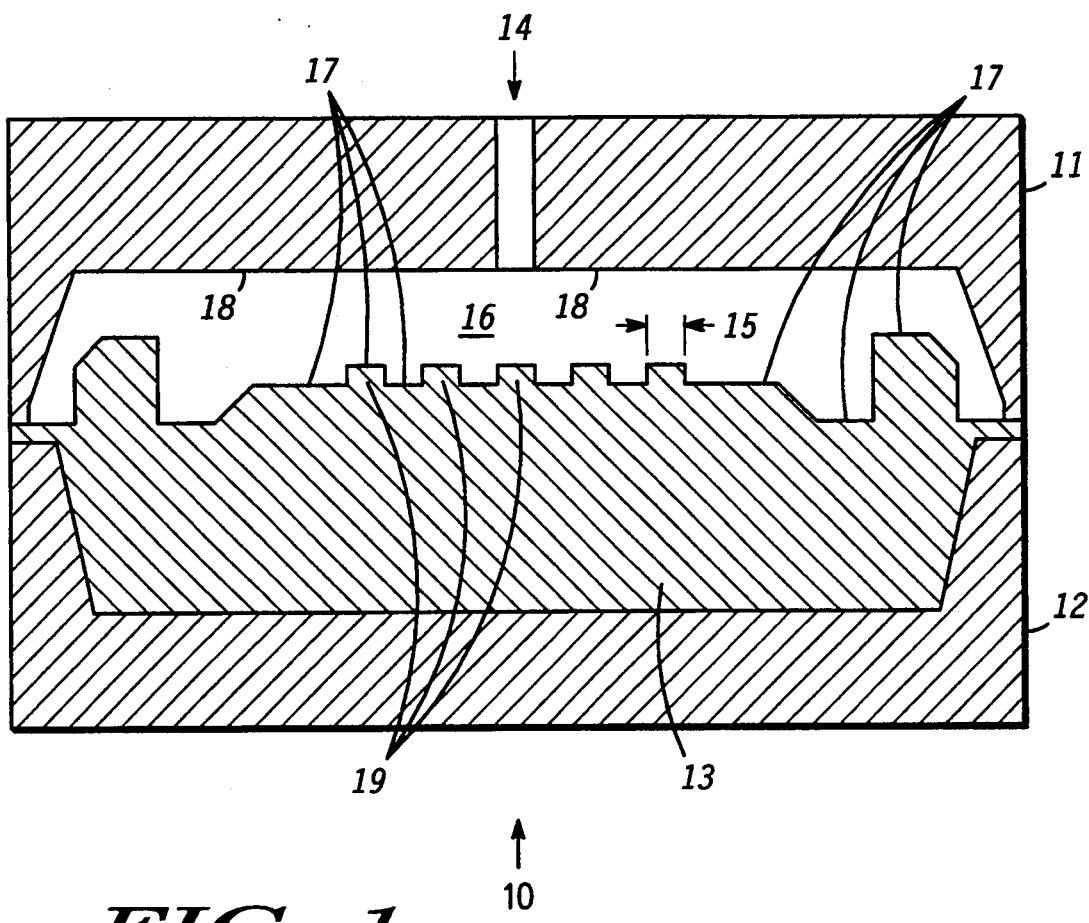
FIG. 1 is a simplified cross-sectional view of a mold.
Figure 2:
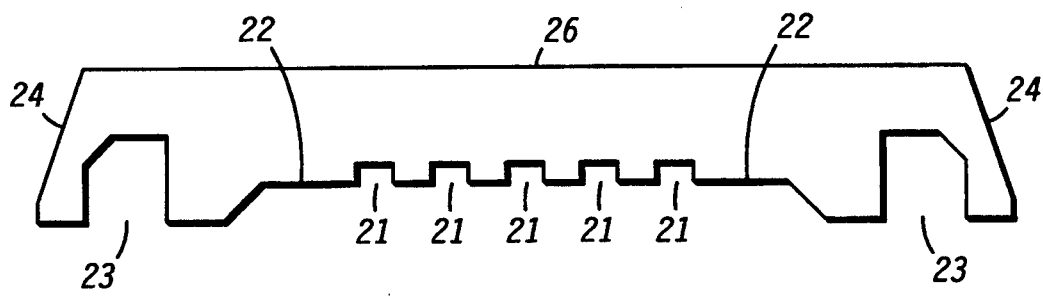
FIG. 2 is a simplified cross-sectional view of a molded first cladding layer.

FIG. 1 is a simplified cross-sectional view of a mold 10 used for making a first cladding layer 20 shown in FIG. 2. It should be understood that mold 10 has been greatly simplified and that only a brief description of mold 10 is necessary for a clear understanding of the present invention. Typically, mold 10 is made of a top portion 11 and a bottom portion 12. Commonly, these top and bottom portions, 11 and 12, are made of a metal materials, such as stainless steel, aluminum, or the like. Further, these top and bottom portions 11 and 12 typically are configured so as to provide appropriate heating and cooling capabilities, as well as providing necessary pressure capabilities that are dictated by the selection of the molding materials or molding compounds. Template 13 typically is made of similar materials as are top and bottom portions 11 and 12. However, it should be understood that while template 13 is advantageous for manufacturing small volumes of a molded product, template 13 would be incorporated into bottom portion 12 for use in manufacturing high volumes of a molded product.

Figure 6:
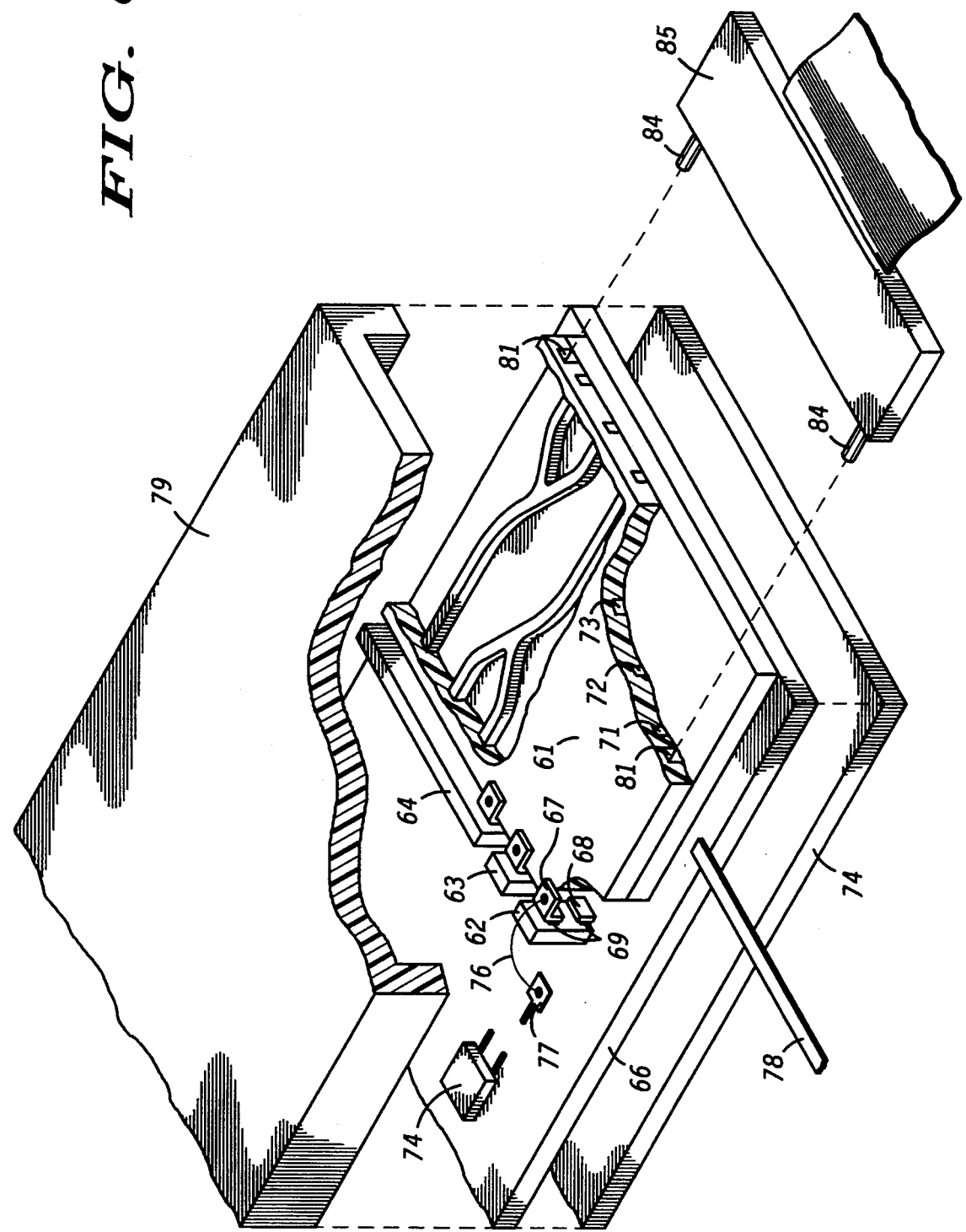
FIG. 6 is a partially exploded simplified pictorial view of an optical electronic module.

Generally, with template 13 placed in bottom portion 12, with top portion 11 and bottom portion 12 securely held together, with the appropriate process conditions selected for the specific molding compound or molding material, the molding material is injected into cavity 16, represented by arrow 14. Features 19 of template 13 are made in a variety of cross-sectional shapes and sizes, such as V-grooves, semicircles, U-grooves, rectangular grooves, with a minimum feature size of 0.5 micron or the like. Further, it should be understood that features 19 extend longitudinally into the paper and that many different geometric patterns are capable of being fabricated with features 19, such as bending or curving of features 19, joining or splitting of features 19, or the like as illustrated in FIG. 6. Also, width 15 of features 19 is capable of being adjusted to meet specific design requirements, such as optical mode mixing, optical mode matching, or adiabatic tapering. However, in a preferred embodiment of the present invention, a rectangular groove that is 50.0 microns by 50.0 microns on each side is used.

Typically, the molding compound is made of an optically transparent material, such as epoxies, plastics, polyimides, or the like. Generally, refractive indexes of these optically transparent materials range from 1.50 to 1.54. In a preferred embodiment of the present invention, optically transparent epoxies are used as the molding material. Processing conditions for these materials range from 22 degrees Celsius to 200 degrees Celsius for molding temperatures and 200 pounds per square inch to 2,000 pounds per square inch for molding pressures. By injecting the molding material, represented by arrow 14, into cavity 16, intricacies of surface 17 of template 13 and intricacies of surface 18 of upper portion 11 are transferred to the molding compound. A subsequent curing process solidifies the molding compound, thereby permanently transferring the intricacies or a negative image of surfaces 17 and 18 to the solidified molding compound in cavity 16.

Once the curing processes are completed, mold 10 is opened and a molded first cladding layer 20, as shown in FIG. 2, is removed from mold 10.

FIG. 2 is a simplified cross-sectional view of the molded first cladding layer 20 formed as described with reference to FIG. 1. Typically, channels 21 are made as rectangular grooves; however, other geometric configurations may be made, such as U-grooves, semicircles, V-grooves, or the like. In addition, channels 21 and 22 are made in such a manner so as to produce smooth defect free surfaces. Surfaces 24 and surface 26 may also be smooth and defect free; however, these surfaces may also be shaped according to specific application. For example, surface 26 may be modeled to provide a greater surface area. Also, it should be understood by one skilled in the art that by molding channels 21 a smooth defect free surface is achieved at a minimal cost. Typically, surface 22 of first cladding layer 20 is recessed into first cladding layer 20, thereby allowing a subsequent adhesive to be spread into channels 21 and across surface 22 without significantly entering openings 23.

FIG. 3 is a simplified illustration of a cross-sectional view of a mold 30 used for making a second cladding layer 40 as shown in FIG. 4. Typically, mold 30 is made of an upper portion 31, a lower portion 32, and a template 33. However, while template 33 is advantageous for low volume manufacturing, it should be realized by one skilled in the art that template 33 would be incorporated into bottom portion 32 in high volume manufacturing.

Generally, as described with reference to FIG. 1 regarding mold 10, mold 30 is closed and brought to appropriate processing conditions. The molding material is injected into cavity 36, represented by arrow 34, thus filling cavity 36. By filling cavity 36 with the molding compound, surfaces 37 and 38 are replicated by the molding compound. Also, as previously describe with reference to FIG. 1, molding compound 34 is cured, solidified, and subsequently removed from mold 30, thereby providing second cladding layer 40 as shown in FIG. 4. Further, while mold 10 and mold 30 are discussed separately hereinabove, it should be understood that mold 10 and mold 30 typically are made together as part of a whole larger mold (not shown). By making mold 10 and mold 30 together several advantages are realized, such as facilitating robotic removal and subsequent robotic processing of first cladding layer 20 and second cladding layer 40, injection of the molding compound can be the same, thus producing similar or equal refractive indexes in first cladding layer 20 and second cladding layer 40.

FIG. 4 is a simplified cross-sectional view of molded second cladding layer 40 formed as with reference to FIG. 3. Typically, second cladding layer 40 is made in such a manner that surface 41 of second cladding layer 40 fits snugly against surface 22 of first cladding layer 20, as shown in FIG. 5. Additionally, a surface 42 may be modeled to suit specific applications, such as increasing surface area.

FIG. 5 is a simplified cross-sectional view of a molded waveguide 50. Molded waveguide 50 is made of first cladding layer 20, second cladding layer 40, and core material 52. It should be evident that first cladding layer 20 has been inverted so as to facilitate the viewing of molded waveguide 50.

Typically, molded first cladding layer 20 and molded second cladding layer 40 are joined by an optically transparent material which forms the core of the waveguide and acts as an adhesive or an optically transparent polymer. The optically transparent adhesive generally may be any of several materials, such as epoxies, plastics, polyimides, or the like. Generally, refractive indexes of these optically transparent materials range from 1.54 to 1.58. It should be understood that to form an optical waveguide the refractive index of core 52 must be at least 0.01 greater than that refractive index of cladding layers 20 and 40. However, in a preferred embodiment of the present invention, epoxies are used to join first cladding layer 20 to second cladding layer 40. Application of the adhesive is done in such a manner so as to completely fill channels 21 of first cladding layer 20, thereby forming core 52. Further, by having core 52 completely surrounded by cladding layers 20 and 40, core 52 has superior performance characteristics for conducting light or light signals. These superior performance characteristics are used in enhancing high speed communications applications, such as chip-to-chip communications, board-to-chip communications, board-to-board communications, computer-to-computer communications, and the like. Additionally, a capability is available, in the present invention, to match refractive indexes of cladding layers 20 and 40. However, while the adhesive completely fills channels 21 of first cladding layer 20, the adhesive is restricted from alignment ferrules 51 by slightly inclining a surface 53. Alignment ferrules 51, as shown in FIG. 5, are made by adhering first cladding layer 20 and second cladding layer 40 together; however, it should be evident to one skilled in the art that alignment ferrules 51 may be made by inverting openings 23 as shown in FIG. 2 into second cladding layer 40. It should be understood, however, that inverting openings 23 as shown in FIG. 2 into second cladding layer 40 can degrade alignment of alignment ferrules 51 to core 52. Typically, the adhesive is cured by a variety of methods, such as air drying, exposure to UV light, heat treating, or the like. Selection of specific curing methods is application specific as well as being dependent upon selection of adhesive and cladding materials that are used for making first and second cladding layers 20 and 40.

By way of example only, first cladding layer 20 and second cladding layer 40 are made by injecting a transparent epoxy molding compound, available under the Tradename HYSOL MG18 from Dexter Corporation, into molds 10 and 30, respectively. Temperature of molds 10 and 30 range between 150° C. to 175° C. with a preferred temperature range from 160 degrees Celsius to 165 degrees Celsius. Molding pressure of molds 10 and 30 range between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, first cladding layer 20 and second cladding layer 40 are removed from molds 10 and 30, respectively. Typically, a post-curing step is necessary in order to achieve maximum physical and electrical properties of the HYSOL material. This step generally proceeds at 150 degrees Celsius for approximately 2 to 4 hours. Completion of the post-cure step results in first cladding layer 20 and second cladding layer 40 having a refractive index of approximately 1.52.

Once the molding and curing processes, as well as the removal of the first and second cladding layers 20 and 40 from their respective molds have been completed, the first and second cladding layers 20 and 40 are ready to be assembled. Assembly of the first and second cladding layers 20 and 40 is achieved by applying an optically clear adhesive with a refractive index at least 0.01 higher than the first and second cladding layers 20 and 40 to surface 22. In a preferred embodiment of the present invention, these requirements are fulfilled by applying an optically clear epoxy available under a Tradename EPO-TEK 301-2 from EPOXY TECHNOLOGY INC. Typically, after the adhesive is applied to surface 22 of the first cladding layer 20, surface 41 of second cladding layer 40 is compressed against surface 22 of first cladding layer 20, thereby squeezing and filling channels 21 and adhering both first cladding layer 20 and second cladding layer 40 together. Additionally, it should be understood that by adhering first cladding layer 20 and second cladding layer 40 together, alignment ferrules 51 are formed. Curing times for the adhesive epoxy is dependent upon temperature, e.g., at room temperature curing time is 2 days and at 80 degrees Celsius curing time is 1.5 hours.

FIG. 6 is a simplified partially exploded pictorial view of an optical electronic module 60. In the present invention molded optical waveguide 61 is electrically coupled to standard electronic components.

Typically, waveguide 61 is fitted with optical components, such as a phototransmitter or laser 62, a photodetector or photodiode 63, or a combination of both lasers and photodetectors. Alternatively, an array 64 can be mounted on waveguide 61 which contains a variety of optical components. The optical components are mounted to molded optical waveguide 61 in such a manner that individual working portions of the optical components are aligned to an individual waveguide, thus providing maximum light transmission through individual waveguides. For example, laser 62 is mounted to tab 67 and tab 68 by solder bump 69. By accurately placing and solder bumping laser 62 to molded optical waveguide 61, light transmission from the working portions of laser 62 through waveguide 71 is maximized.

Generally, molded optical waveguide 61 with attached optical components is attached to interconnect board 66. Several methods may be used for attaching interconnect board 66 to molded optical waveguide 61, such as adhering, press fitting, molding or the like. However, in a preferred embodiment of the present invention, an epoxy adhesive is applied to interconnect board at an approximate location where the molded optical waveguide 61 and the interconnect board 66 are to be bonded. Waveguide 61 is placed onto the adhesive by an automated system such as a robot arm, thereby providing accurate placement and orientation of waveguide 61.

Subsequent electrical coupling of standard electrical components, as illustrated by integrated circuit 74, on interconnect board 66 to the optical components is achieved by a wire bond 76 from bonding pad 77 to tab 67. It should be evident by one skilled in the art, that many more electrical couplings typically are necessary to fully utilize inputs and outputs of both the standard electrical components and the optical components. It should be further evident that standard output and input means, represented by lead 78, are used to couple other components as well.

Further, plastic encapsulation of interconnect board 66 and molded optical waveguide 61 typically is achieved by an over-molding process, represented by plastic pieces 79, which encapsulates interconnect board 66 and optical waveguide 61 while leaving alignment ferrules 81 open and clear of debris. Alignment ferrules 81 are then engaged by alignment pins 84 of optical fiber ribbon 85, thereby providing accurate and repeatable alignment of waveguides 71, 72, and 73 to optical fiber ribbon 85.

By now it should be appreciated that a novel method for making a molded optical waveguide and an optical electrical module have been described. The method allows for the making of waveguides cost effectively, thus allowing their usage in optical electrical modules. Additionally, this method allows for an inexpensive process for combining both standard electrical components and optical components.

We claim:

1. A method for fabricating an optical electronic module comprising:
   providing an interconnect board having standard electronic components, output leads, and at least one interface pad, the at least one interface pad connects the standard electronic components and the output leads interactively;
   attaching a molded split waveguide to the interconnect board, the molded split waveguide comprising a channel that splits into at least two channels, an alignment guide, and a optical component having an active area and an output pad, the channel and the at least two channels and the alignment guide are molded therein and the optical component is mounted onto the molded split waveguide aligning the active area of the optical component to the channel; thereby enabling the optical component to respond to an optical signal traveling through the molded split waveguide; and
   connecting the interface pad of the interconnect board with the output pad of the split waveguide, thereby interconnecting the standard electronic components to the optical component.

2. A method for fabricating an optical electronic module as claimed in claim 1 wherein the connecting of the interface pad of the interconnect board with the output pad of the split waveguide is accomplished by wire bonding.

3. A method for fabricating an optical electronic module as claimed in claim 1 wherein the attaching of the molded split waveguide is accomplished by an adhesive.

4. A method for fabricating an optical electronic module as claimed in claim 1 further comprising:

providing an optical connector having an alignment guide with a fiber optic ribbon cable attached thereto;

attaching the optical connector to the molded split waveguide by aligning the alignment guide of the optical connector and the alignment guide of the molded split waveguide, thereby aligning a fiber of the fiber optic ribbon cable to the channel of the molded split waveguide.

5. A method for fabricating an optical electronic module comprising:

providing an interconnect board having standard electronic components, output leads, and an output pad;

attaching a molded waveguide with at least one optical electronic interface to the interconnect board; and connecting the output pad to the at least one optical electronic interface, thereby interconnecting the standard electronic components to the optical electronic interface.

6. A method as set forth in claim 5 wherein the connecting of the output pad and the at least one optical electronic interface is accomplished by wire bonding.

7. A method as set forth in claim 5 wherein the attaching of the molded waveguide is accomplished by adhering the molded waveguide to the interconnect board with an adhesive.

8. A method as set forth in claim 5 further including the step of:

encapsulating the optical electronic module leaving the leads exposed.

9. An optical electronic module comprising:

an interconnect board having standard electronic components, output leads, and an output pad;

a molded waveguide with at least one optical electronic interface attached to the interconnect board;

means for connecting the output pad to the at least one optical electronic interface, thereby interconnecting the standard electronic components to the optical electronic interface.

10. An optical electronic module as set forth in claim 9 wherein the means for connecting the output pad to the at least one optical electronic interface is achieved by wire bonding.

11. An optical electronic module as set forth in claim 9 wherein the optical electronic interface is either at least a photodiode or a laser.

12. An optical electronic module as set forth in claim 9 wherein the molded waveguide is attached to the interconnect board by an adhesive.

13. An optical electronic module as set forth in claim 12 wherein the adhesive is an epoxy.

14. An optical electronic module as set forth in claim 9 further including a cover encapsulating the optical electronic module, wherein the leads are left exposed.

* * * * *